Patented Dec. 3, 1946

2,412,177

UNITED STATES PATENT OFFICE 2,412,177

DRYING OIL MANUFACTURE

Alexander Schwarcman, Buffalo, N. Y., assignor to Spencer Kellogg and Sons, Inc., Buffalo, N. Y., a corporation of New York No Drawing. Application February 12, 1943, Serial No. 475,652

12 Claims. (Cl. 260—404.8)

This invention relates to drying oil manufacture; and it comprises a method of preparing drying oils having improved characteristics from fatty oils, including drying and semi-drying vegetable oils, and marine oils, wherein a fatty oil, such as linseed oil, is caused to react with a minor amount of polyhydric alcohol, advantageously glycerine, in a proportion from 1 to 7 per cent on the weight of the oil, forming an intermediate product having uncombined hydroxyl groups, and this intermediate is reacted with an amount of polybasic acid just sufficient to esterify the said uncombined hydroxyl groups, the polybasic acid also being used in the approximate proportion of from 1 to 7 per cent on the weight of the oil; and it also comprises the improved drying oil obtainable as herein disclosed, this new oil having substantially the appearance and many of the characteristics of untreated fatty oils, but being capable of polymerization in a very short time, of drying quickly to a tack-free film, and of forming especially waterproof films upon drying; all as more fully hereinafter set forth and as claimed.

Many of the known drying oils, including linseed oils, perilla oil, China-wood oil, oiticica oil, walnut oil, soya bean oil, sunflower oil, poppy seed oil, etc., are used in their natural state as drying oils for the production of protective or decorative coatings, preferably after admixture of a minor amount of catalytic drier, such as compounds of cobalt, lead, manganese, etc. It is also known that most of these oils can be polymerized by heating to elevated temperatures, which are usually of the order of 550° to 600° F., and that the viscosity of the oils is thereby increased, and certain other characteristics are modified.

For some purposes, the raw or unpolymerized oils are widely used. This is often the case in general exterior and interior painting. The polymerized oils, such as stand oil, are also widely used in painting, usually after thinning or reducing them with solvents to the consistency desired for brushing, spraying, or other methods of application. It is well known that the polymerized oils have certain advantages over the unpolymerized oils, in that they usually flow better and spread to a uniform surface, which does not show brush marks. Also, polymerization generally makes the film produced from the oil more water-proof, and eliminates a good deal of the after-yellowing effect, which is encountered with some raw oils. Furthermore, when completely dried, either alone or in the presence of pigments, a polymerized oil film is generally harder, or more "thoroughly dry" than a raw oil film.

However, films of polymerized oils generally dry more slowly than raw oil films, and remain tacky for a considerably longer period. This is a marked disadvantage for many applications, since a film which remains tacky for any length of time must be protected from dust, moisture, etc., during the drying period, or the coated surface will suffer permanently. Polymerized oil films have therefore not been widely used in many applications for which they are well suited, because other types of films dry much more rapidly. This is a great advantage in many industries, such as the automobile industry and the furniture industry, where quick drying is highly important. Quick drying is also very important in many other applications, such as lithography and printing, where slow drying of the ink causes spoilage, blotting, etc.

An object achieved by the present invention is the production of polymerized drying oils which dry very rapidly to a dust-free, non-tacky condition, often equalling in this respect other types of spraying lacquers. A further object achieved by this invention is the provision of a polymerized oil which dries to an especially waterproof film. In accordance with a yet further object there is provided a modified drying oil product which is capable of polymerizing much more rapidly with an accompanying elimination of adverse side reactions.

These objects and advantageous results are achieved in accordance with this invention by combining a fatty oil, such as a drying or semi-drying vegetable oil or marine oil, with a minor amount, advantageously about 1 to 7 per cent by weight, of a polyhydric alcohol, such as for example glycerine. The oil and glycerine are agitated together at an elevated temperature, usually between 400° and 500° F., until reaction is complete and the free glycerine has disappeared. The time required for this operation varies with the quantity of the materials treated, from several minutes to one hour or more. The time may be shortened and the operation conducted more efficiently by introducing a small amount of catalyst. It is well known that litharge and various alkaline materials, as well as several of the alcoholates and soaps, are catalysts for reactions of this type, which is known generically as alcoholysis.

The product of this treatment is a homogeneous ester of glycerol containing some free or uncombined hydroxyl groups. To this product is added, in substantially the stoichiometrical proportion corresponding to the polyhydric alcohol introduced, a polybasic acid, and the mixture is heated with agitation until esterification occurs. Any of the various types of polycarboxylic acids may be used for this purpose and especially advantageous results are obtained when using maleic acid or fumaric acid. Of course the anhydrides of the foregoing acids are equally suitable and may be substituted for the respective acids without disadvantage. Phthalic acid and its anhydride, when employed in this step of the process, likewise results in a materially improved product.

Advantageously the amount of polycarboxylic acid employed corresponds approximately to that required for complete esterification of the polyhydric alcohol added in the preceding step. In other words, the relative amounts of polyhydric alcohol and acid employed are preferably proportioned so as to substantially completely esterify all of the available alcoholic and carboxylic acid groups introduced. This result is conveniently attained by continuing addition of the polycarboxylic acid or its anhydride until a product of low acid number results. The approximate relative quantities of reagents required to complete the reaction are equivalent to the stoichiometrical proportion of the alcohol and acid required for complete esterification. This, therefore, forms a good approximate index of optimum proportioning. While the advantages of the present invention are secured with some variation from optimum procedure, it is, however, desirable in all cases to approximate the final condition of low acid value desirable in drying oil of the present class, namely, an acid number below 5 to 10.

In this part of the process, the temperature is advantageously raised somewhat above 500° F. During the reaction, there is a substantial discharge of water vapor formed in the esterification. When the reaction is complete, and the water has been eliminated, the product becomes entirely clear.

At this stage, there is obtained an improved drying oil having very low acid number and excellent drying properties. The material may be sold and used as such, but is advantageously polymerized before use. Polymerization may be effected by the manufacturer, or as a separate process conducted by the purchaser. It is generally most economical to polymerize immediately, since all that is required for this purpose is to raise the temperature to the bodying range, which is usually somewhat above the reaction temperature, and to maintain it for a very short time. One of the advantages of this product is that it polymerizes so much more rapidly than the oils used as starting materials. This is highly advantageous, since the loss of oil during polymerization and the development of acidity are usually functions of the time required for polymerization. In bodying ordinary linseed oil, a time on the order of five hours or more is generally required to bring the oil up to a viscosity of Z-6 on the Gardner-Holdt scale. During this treatment there is a substantial loss of oil, and the acidity may increase to 8 or 10 per cent. In contrast, the same body may be obtained in an oil treated as described hereinabove, by heating for considerably less than one hour—often in 30 to 40 minutes. Under these conditions, the loss of oil during polymerization is negligible, and the acidity does not increase beyond 1 or 2 per cent.

Further advantages of the product are that after polymerization, it will dry to a dust-free film in four hours or less, as compared with 48 hours or more for the ordinary polymerized linseed oil. Furthermore, when dry, it forms a film of greatly increased resistance to moisture, or "waterproofness." In this respect, the improved oil of this invention more closely resembles China-wood oil than the polymerized linseed oil available heretofore.

The process by which this improved oil is obtained can be performed in the open at atmospheric pressure. The operations can also be performed under vacuum, and this is often advantageous, since it makes it posible to obtain a lighter colored product. It is well known that the presence of atmospheric oxygen during treatments at high temperatures generally has a tendency to darken fatty oils, and this is true in the present case. Operating under vacuum, or in an atmosphere of inert gas, prevents this.

In a typical embodiment of this invention, 1900 pounds of linseed oil and 70 pounds of glycerine (3.7 per cent by weight) were mixed together with 0.6 pound of litharge, to serve as a catalyst. The mixture was agitated while the temperature was raised to 440° F., and this temperature was maintained until the free glycerine, which had originally floated on the surface, disappeared. A sample of the mixture taken at this stage was completely transparent and homogeneous. The heating required about forty minutes at the attained temperature in this instance.

The compound thus obtained, consisting principally of combinations of glycerine with linseed oil acids with the glycerine present in excess, was further agitated, and about 132 pounds of fumaric acid were added. The temperature was brought up to 520° F., at which time there was a strong discharge of water, indicating that esterification was taking place. After the water was completely discharged and the oil became clear, the agitation was stopped.

At this stage, the product could be withdrawn for use or sale, if desired. However, in this instance, the temperature was brought up to 590° F., and maintained at that point for about forty minutes. At that time, a polymerized oil having a viscosity of Z-6 on the Gardner-Holdt scale was obtained.

After cooling, the oil was tested, and found to have an acid number between 2 and 3. A sample of the oil was subjected to a drying test and found to lose its tackiness in about two hours and to form an extremely waterproof film.

In another embodiment of this invention 1500 pounds of soya bean oil were heated to about 300° F., 45 pounds of glycerine (3 per cent by weight) were added while stirring, and the temperature was brought up to 430° F. and held for one half hour. The temperature was then raised to 480° F. and held there for another half hour until the oil was entirely clear and no more vapor was escaping. The oil was then cooled down to about 300° F., and 85 pounds of fumaric acid were added. The temperature was brought up slowly to 520° F. and after there was no more discharge of water, indicating that the esterification of the added acid and the newly formed glyceride was completed, the temperature was brought up to about 560° F. At this temperature any remaining traces of the acid were combined, giving a product of very low acid value. During the two stages, namely, the combination with glycerine and the esterification with acid, a current of inert gas (such as nitrogen or carbonic acid) was passed through the oil or into the space above the oil, to eliminate oxidation and darkening.

At this stage the oil was somewhat heavier than the original oil and could be used as such, but the heating was continued at 560° F. and the consistency increased very rapidly to Z-6, reaching this viscosity in about one-third the time required to polymerize the original oil to this extent. By the same procedure, exceptionally good results were obtained with marine oils, such as menhaden oil.

Similar operations were also conducted under vacuum with similar results, except that a somewhat lighter colored product was obtained. Also, various other oils of the type previously mentioned were treated in a similar manner with similar results. As noted, exceptional results were obtained in the treatment of marine oils, such as sardine and menhaden oils, in accordance with the method described. It is well known that these marine oils contain only a minor proportion of drying constituents (clupanodonic esters) and a preponderance of non-drying esters which ordinarily prevent satisfactory drying of these marine oils when used alone. For this reason, marine oils are generally used only in admixture with other oils having better drying properties. I have found that by treating these marine oils with minor amounts of polyhydric alcohols, such as glycerine, and polybasic acids, such as maleic and especially fumaric acid, as described hereinabove, it is possible to convert marine oils into oils having excellent drying properties.

While the foregoing examples have been presented with glycerine as the illustrative polyhydric alcohol, the invention is not so limited but contemplates the utilization of any alcohols coming within the field of polyhydric alcohols. Thus, products having the improved and advantageous characteristics sought by the present invention, are prepared by processes wherein dihydric alcohols such as propylene and ethylene glycol are substituted for glycerine in the initial step of alcoholysis. Where, however, the polyhydric alcohol molecule contains an increasing number of hydroxyl groups, the results achieved are even more advantageous. In general, the final drying oil possesses superior drying qualities, forms especially waterproof films and polymerizes even more rapidly. Thus, where the erythritols as, for example, penta-erythritol, are employed, "bodying" sufficient for most purposes takes place merely upon heating the product to the bodying range. Polymerization is thus sufficiently rapid to materially inhibit side reactions and the formation of undesirable products as pointed out above.

Similar results are characteristic of processes employing even higher polyhydric alcohols as, for example, the hexahydric alcohols, sorbitol and mannitol.

In accordance with an embodiment of this invention employing a dihydric alcohol, 14250 pounds of linseed oil were heated to about 450° F. 630 pounds of propylene glycol were added slowly with stirring over a period of about two hours. The temperature during addition was kept within 450°–500° F. At the end of this time the mass of oil was clear and homogeneous. 812 pounds of maleic anhydride were slowly added and the temperature was brought slowly to 540° F., at which time there was a strong discharge of water vapor. After discharge of the vapor had ceased and the oil became clear, agitation was stopped. In this embodiment about three hours were required to complete addition of all the maleic anhydride and completion of the reaction. The product of the foregoing treatment possessed an acid number of 5–8. The product may, however, be varied in accordance with the acid number desired or permissible for the purpose intended, although as indicated above it is usually desirable to produce a product having a low acid number approximating zero. A slightly decreased addition of acid will result in a product of lower acid number. It will be apparent that the quantity of polycarboxylic acid necessary to complete the reaction may be readily determined from the acid testing of successive test samples.

In accordance with another embodiment 10,000 pounds of linseed oil were heated to about 300° F. and 520 pounds of penta-erythritol were added slowly by stirring, while the temperature was brought up to about 450° F. Heating and mixing were continued until the polyhydric alcohol had been completely absorbed into the oily mass, leaving a homogeneous transparent composition. At the end of this time 748 pounds of maleic anhydride were slowly added while the temperature was brought up to about 540° F. Samples tested indicated an acid number of 2–3, whereupon agitation was stopped. The product as indicated above was particularly valuable in that it was capable of being polymerized to a Z–2 body by merely bringing it to a temperature of 570° F.

Even greater quantities of the polyhydric alcohol and polybasic acid may be employed with satisfactorily resulting improvement. Thus, in the foregoing example 600 pounds of penta-erythritol may be employed and 864 pounds of the maleic anhydride. On the other hand, lower proportions may be used with results that are still quite advantageous. For example, a good commercial product results when only 280 pounds of penta-erythritol and 403 pounds of maleic anhydride are utilized in the above embodiment. As indicated above, the advantages of the present invention are in each instance noticeable down to and including quantities approximating one per cent of the amount of oil used.

In an embodiment illustrating the use of the hexahydric alcohols 9300 pounds of linseed oil were heated to about 300° F. and 350 pounds of mannitol added slowly while heating to about 480° F. When the product was clear and homogeneous the temperature was raised to about 540° F. and 565 pounds of maleic anhydride were slowly added with stirring until the acid value became very low. By this procedure a product of quite improved character was obtained. Similarly good results were obtained where sorbitol was substituted for the mannitol above.

As previously stated, I find it most advantageous to employ about 1 to 7 per cent each of glycerine and the polybasic acid in the process of this invention. Smaller quantities of these constituents do not give the optimum results, although they generally effect some improvement. Larger quantities, materially exceeding about 1 to 7 per cent of the glycerine and the equivalent amount of polybasic acid, do not improve the quality of the treated oil, and therefore the expense of larger quantities is seldom justified.

As stated above, the glycerine or other polyhydric alcohol and the fumaric acid, or other polybasic acid or anhydride, are employed in substantially stoichiometrical proportions so that a substantially neutral product is obtained. If desired, however, a slight excess of glycerine may be employed to neutralize the acidity which sometimes develops during high temperature treatment. Also, it is sometimes advantageous to add other fatty oils or their acids along with the polybasic acid in the process of this invention. In that case, the quantity of glycerine employed is generally made sufficient to insure that a neutral, substantially acid-free product is obtained. In any case, as previously noted, the finished product has substantially the appearance of an oil of the type used as a starting material, when polymerized to the same viscosity. It differs from the starting oil chiefly in its rapid drying characteristics and the waterproofness of the film formed therefrom. In many instances, as with marine oils, the odor of the oil is substantially improved by the treatment. Also, the unpolymerized oil obtained in accordance with this invention differs from the original oil in being capable of much more rapid polymerization.

It will be noted that in the foregoing illustrative embodiments some of which are carried out at the limits of the stated range, the proportion of polycarboxylic acid utilized may vary somewhat from the proportion of the polyhydric alcohol. As will be understood from the above this follows from the stoichiometrical relationship necessary to form the optimum product having a low acid number. It will be further understood that in preparing such products the stoichiometrical proportion of polycarboxylic acid which is approximately sufficient to esterify the free hydroxyl groups introduced, without any appreciable excess of carboxylic groups will depend upon the relative molecular weights of the reactants and their molar combining ratio. Accordingly while the range of 1 to 7 per cent is relatively critical in the case of the polyhydric alcohol it is relatively less critical as applied to the polycarboxylic acid and represents more of an approximation in preparing oils of optimum low acid number.

It is further important to point out that many somewhat similar products may be obtained by substituting a fatty acid of a drying or semi-drying oil as a starting material provided that esterification with the polyhydric alcohol is carried out to a degree equivalent to that represented by the product of alcoholysis mentioned above. In other words, the drying or semi-drying oil fatty acid may be reacted with a polyhydric alcohol with the latter ingredient in excess. The excess of polyhydric alcohol should amount to from about 1 to 7 per cent on the weight of the total amount of the reactants which are theoretically required to produce a completely esterified oil. The resulting product may then be reacted with a quantity of polycarboxylic acid stoichiometrically corresponding to the amount of hydroxyl groups theoretically present in the oil. As in the earlier described process, the amount of polycarboxylic acid accordingly falls within the approximate range of 1 to 7 per cent on the amount of the oil ester present. Advantageously, however, the quantity of polycarboxylic acid employed is sufficient to result in a product having a low acid number. In other words the portion of polycarboxylic acid preferably added is that approximately corresponding to the stoichiometrical proportion required to completely esterify all of the hydroxyl and carboxylic groups present in the reaction mixture.

It will be apparent from the foregoing that by the term polybasic acid, as used in the present specification, is meant polybasic organic acids, namely, the so-called polycarboxylic acids and their obvious equivalents such as the acid anhydrides.

The present application is a continuation-in-part of my application Serial No. 392,555, filed May 8, 1941.

While my invention has been described with reference to certain features and embodiments thereof which are now considered especially advantageous, the scope of the invention is not limited to these specific embodiments and features except as indicated in the appended claims.

What I claim is:

1. A process of manufacturing improved drying oils capable of bodying rapidly to a fast drying product, which comprises heating a fatty oil having drying properties with approximately from 1 to 7 per cent on the weight of the oil of a polyhydric alcohol until reaction is substantially complete and esterifying the reaction product with approximately 1 to 7 per cent on the weight of the oil of a polybasic acid of the class consisting of polycarboxylic acids and their anhydrides, to form an oil of low acid number.

2. The method of claim 1 wherein the polyhydric alcohol is glycerine.

3. The method of claim 1 wherein the polybasic acid is maleic acid.

4. The method of claim 1 wherein the polybasic acid is fumaric acid.

5. The method of claim 1 wherein the polyhydric alcohol is penta-erythritol.

6. The method of claim 1 wherein the fatty oil is soya bean oil.

7. The method of claim 1 wherein the fatty oil is linseed oil.

8. The method of claim 1 wherein the fatty oil is manhaden oil.

9. The method of claim 1 to which is added the step of heating the esterified product to a temperature of approximately from 550° to 600° F. to develop the desired viscosity.

10. A process of manufacturing improved drying oils capable of bodying rapidly to a fast drying product which comprises heating a fatty oil having drying properties with approximately from 1 to 7 per cent on the weight of the oil of a polyhydric alcohol until reaction is substantially complete and reacting the reaction product with an amount of polycarboxylic acid falling within the range of approximately 1 to 7 per cent on the weight of the oil and just sufficient to form a product of low acid number.

11. A process of manufacturing improved drying oils capable of bodying rapidly to a fast drying product, which comprises heating a fatty oil having drying properties with approximately from 1 to 7 per cent on the weight of the oil of a polyhydric alcohol until reaction is substantially complete and esterifying the reaction product with a polybasic acid of the class consisting of polycarboxylic acids and their anhydrides, said acid being added in approximately that combining proportion just sufficient to esterify all of the free hydroxyl groups present in the reaction mixture and to form an oil of low acid number.

12. A process of manufacturing improved drying oils capable of bodying rapidly to a fast drying product which comprises heating a fatty oil having drying properties at a temperature approximating 450° to 500° C. with about 3 per cent of glycerine until reaction is substantially complete and esterifying the reaction product at a temperature approximating 540° F. with a polybasic acid of the class consisting of polycarboxylic acids and their anhydrides, said acid being added in approximately that combining proportion just sufficient to esterify all of the free hydroxyl groups present in the reaction mixture and to form an oil of low acid number.

ALEXANDER SCHWARCMAN.